Patented Apr. 19, 1927.

1,625,732

UNITED STATES PATENT OFFICE.

LOUIS LE FRANC, OF PARIS, FRANCE, ASSIGNOR TO LEFRANC & CIE., OF PARIS, FRANCE, A COMPANY.

MANUFACTURE OF BUTYRIC ACIDS AND OTHER ALIPHATIC ACIDS.

No Drawing. Application filed August 18, 1922, Serial No. 582,804, and in France September 26, 1921.

The substances available for the manufacture of the organic aliphatic acids such as formic, acetic, propionic, butyric, valeric, caproic acids, etc., are numerous; they range from vegetable waste to waste of animal origin. In the first case, these may be constituted by sawdust, bark, twigs, stumps, vine branches, leaves, ferns, various stems, etc.; in the second case they are the residues from the skinning and cutting up of animals, from slaughter-houses, tan yards, wool-washings, etc.; use may even be made of excreta of all kinds.

The present invention has for its object a process permitting the use, for manufacture of butyric acid, of waste wood, sawdust, bark, stumps etc., that is, material which is found in abundance and which is cheap.

An important feature of the process according to the invention consists in that, after having obtained sugary musts by means of said cellulose substances, a fermentation of these musts by symbiosis is effected, for instance by using as ferments sugary solutions to which are added the usual proportions of mineral salts and which are sown with the bacilli of the intestinal digestion of herbivorous animals, or with bacilli contained in garden soil, this special method of fermentation permitting the splitting of all the reducing sugars into aliphatic acids, and chiefly into butyric acid.

Other features of the invention will be set forth in the following description.

The process according to the invention is carried out as follows: The waste wood is mechanically reduced to a powder which is as fine and regular as possible. If necessary, the mass is lixiviated by a stream of hot or cold water, so as to eliminate the tannins, resins and useless soluble matter. The hydrolysis of the material thus obtained is effected, and to this end, the powder of wood or the paste, which has been lixiviated, is brought by stirring to a percentage of water which may vary from two to five times the weight of the original dry matter. A quantity of sulphuric acid which represents in $H_2SO_4$ from 2 to 5% of this same matter, is first added to this water. The mass which is made quite homogeneous by trituration is placed in a digester provided with a powerful stirrer. It is obvious that this apparatus should be in all the internal parts absolutely unattackable by acids.

The stirring is started up; steam at 170° C. or at a pressure of 7 kgs. to 7.5 kgs. per sq. cm. is injected within the paste in motion. When this temperature and pressure are reached, the steam is caused to expand, and the pressure having fallen, the mass is discharged out of the apparatus. It is necessary as far as possible, to carry on this operation rapidly. In practice, it lasts about half-an-hour.

The mass is received in a mixer which is enamelled or lined inside with a lead covering. The hydrolysis has in fact set free and has formed complex organic acids which have increased the original acidity due to the sulphuric acid by 15 to 25%. It is then required to neutralize this excess of acid. The neutralizing takes places in the mixer, which is started up. The hot mass, which is energetically triturated, is mixed with a slight excess of chalk in milky liquid state or in powder. Saturation of the acids is rapidly obtained and the reaction of the mass should be absolutely neutral. Milk of lime may be substituted for milk of chalk; in this case, care should be taken not to render the mass alkaline, otherwise there would be a risk, at the high temperature of operating, of forming soluble calcium compounds which are very prejudicial to subsequent work.

The neutralized ligneous paste is placed in an apparatus for exhaustion such as is used in the sugar industry for extracting beet juice by diffusion. Starting for example with 100 kgs. of sawdust, if 25 to 30% of total reducing sugars are produced by hydrolysis, a well-conducted exhaustion should produce from the musts from 8 to 12% of sugar, with a final loss of 0.20 to 0.30%. The musts are then placed if necessary in a cooling device with water circulation as in distilleries in order to bring them to the temperature of fermentation which is 40° C.

Besides the sugars, the musts contain inert or harmful impurities such as gums, resins, mucilages, aldehydes etc. which are to be removed in order not to hinder the progress of the fermentation. To this end, said musts are placed in a mixing tank in which milk of lime is added to them until a clearly alkaline reaction is shown. An abundant precipitate which rapidly settles is at once formed, and is separated from the liquid by filtering either in a filter press or in any other filter. When it is desired to attain a more complete purifying, recourse may be had to the action of animal charcoal as is done in sugar manufacture or refining.

This very simple purifying method is extremely advantageous. The coefficient of purity of the musts before purifying is about 70. After purifying by lime, it rises to 88 or 90, and after treatment with animal charcoal it rises to 95%.

It is then proceeded with the fermentation of said purified musts in symbiosis. The cultures employed which will act in symbiosis upon the musts are obtained by sowing sugary solutions (glucose or saccharose) to which are added the usual proportions of mineral salts, with the bacilli of the intestinal digestion of the herbivorous animals. Recourse can also be had to the bacteria contained in garden soil. After 4 or 5 successive fermentations at 40° C., the cultures are in condition to act upon the wood musts in symbiosis.

It is thought that this is due to the fact that the cultures thus prepared in sugary solutions and at 40° contain chiefly butyric bacilli and bacilli of the putrefaction, which is confirmed by the fact that natural butyric fermentation appears to be due to the combined action of butyric bacilli and other bacilli of the putrefaction acting in symbiosis. It should also be noted that owing to the successive cultures at 40° C., the culture contains only thermophilic bacilli, useful for the butyric fermentation in symbiosis, while all thermo-resisting but not thermophilic bacilli, which would lead the fermentation to the production of lactic acid or alcohols are eliminated. The culture is then sown upon the sugary musts obtained from wood.

The fermentation is anaerobic and is performed in closed vessels constituted by large wood casks provided at the bottom with a filling cock and an emptying cock, and at the upper part with a pipe having a valve for the discharge of gas. The musts, to which have been previously added 5 to 7% of powdered calcium carbonate and about 0.5% of potash phosphate and the same quantity of an ammonia salt, such as a nitrate or sulphate, are introduced at a temperature of 35° to 40° C. and the temperature of the fermenting rooms should be kept at about 38° or 40° C. After several hours, the fermentation begins, and it gradually increases while producing froth which becomes thicker and finally collapses. At the same time, gases are given off in abundance. As soon as they cease to be produced, the fermentation is finished. The duration of the fermentation depends upon the purity of the liquids. The purer the liquid, the more rapid is the fermentation. It varies, according to the degree of purity, from 6 to 12 and even 15 days. The fermented musts are then taken off and placed in an evaporating apparatus in order to extract therefrom by concentration the calcium butyrate from which the butyric acid will be subsequently extracted.

The wood musts thus fermented by symbiosis will contain only very small quantities of reducing sugars. But concurrently with the butyric acid, which remains predominant, acetic acid, a small amount of propionic acid, valeric acid and sometimes caproic acid are also produced. The advantage of this new method will be seen by remarking that 100 kgs. of wood yield 25 kgs. of total sugars for example, which by the method of fermentation with pure butyric bacilli would have yielded 8 to 9 kgs. of normal butyric acid, whilst the same quantity of wood will yield, in the fermentation by symbiosis, from 9 to 9.5 kgs. of said acid and some 2 kgs. of acetic acid and various other acids.

The fermented musts are then concentrated. In an evaporating apparatus of the Kestner type, termed apparatus of the straining-out variety, the musts are concentrated by eliminating the calcium sulphate as fast as it is precipitated. When they have reached the consistency of a thick sirup, they are caused to flow into a boiler, preferably closed in order to produce a vacuum therein, and are brought by heating to the dry state. They are discharged by emptying means situated at the bottom of the heating vessel.

The extraction of the acids is then performed as follows: Into a hermetically closed apparatus which cannot be attacked in the interior by acids, and having above the same a fractional distillation apparatus, provided with a heating device with double bottom, with a lower outlet and with a powerful mixing device, the salts of calcium, butyrates or others, which have flowed from the vacuum boiler, are introduced, and at the same time, a stated quantity of sulphuric or hydrochloric acid is mixed with these salts, in order to disengage the volatile organic acids. This quantity is the equivalent of the quantity of calcium contained in the solution, this being shown by previous analysis. The mass is heated while triturating, and the acids such as acetic, propionic, butyric, etc. are collected by fractional distillation.

As hydrochloric and sulphuric acids are expensive at the present time, it is preferable to use sodium bisulphate which constitutes a waste product of no value from the manufacture of nitric acid. This sodium bisulphate of soda is dissolved in lukewarm water to saturation and is mixed in equivalent quantity with the organic salts of calcium discharged from the vacuum boiler, and the distillation as above set forth is performed.

This treatment affords the recovery of the solid and liquid by-products; 1.000 kgs. of waste wood giving 25 to 30% of sugar, leave 700 to 750 kgs. of cellulose substances which, after drying under pressure in special furnaces, are used to produce steam and for the different heating purposes in the manufacture.

On the other hand, according to the equation for the reducing sugars forming butyric acid:

$$C_6H_{12}O_6 = C_4H_8O_2 + 2CO_2 + H_2$$

there is obtained,

| | |
|---|---|
| Butyric acid= | 48.9 |
| Carbon dioxide= | 48.9 |
| Hydrogen= | 2.2 |
| | 100.0 | or, per ton of wood yielding 250 kgs. sugar, carbon dioxide 120 kgs., hydrogen 5.5 kgs.

This proportion of carbon dioxide is exact in practice since it is required to add thereto the carbon dioxide obtained from the decomposition of the carbonate of lime necessary for the fermentation. This enormous quantity of carbon dioxide can be readily recovered. To this end, the gases are drawn from the tanks by an offtake fan and sent into boilers heated by worms and filled with a saturated solution of sodium carbonate. There are formed sodium bicarbonates which are then decomposed by boiling; the carbon dioxide is collected and can be liquefied and stored up in tubes.

The hydrogen is also collected, and is compressed in tubes; it may be used for heating or for any other use.

It is observed that by the process of manufacture of butyric acid as above set forth, a certain proportion of aliphatic acids such as acetic acid, propionic acid, valeric acid, etc., can also be produced according to the composition of the cellulose substances submitted to the treatment.

Having now described my invention, what I claim as new and desire to secure by Letters Patent is:

A process of manufacture of butyric acid, starting with cellulosic substances, which comprises the following steps: first reducing said cellulosic substances into a powder; hydrolyzing said powdered substances into a sugar must at about 170° C.; neutralizing the acids produced by means of calcium carbonate; purifying by adding calcium oxide until an alkaline reaction is shown, whereby the harmful impurities are precipitated and the medium is adapted to the biochemical action; bringing the must to about 40° C.; preparing a culture by sowing sugary solutions with bacilli of the types found in garden soil; effecting successive fermentations of said culture at 40° C.; sowing the purified must with the culture thus prepared which is capable of a symbiotic action upon the must; allowing said sown musts to ferment in a closed vessel and separating the butyric acid obtained in the form of a butyrate substantially as described.

In testimony whereof I have signed my name to this specification.

LOUIS LE FRANC.